US008538001B2

(12) United States Patent
Pike et al.

(10) Patent No.: US 8,538,001 B2
(45) Date of Patent: Sep. 17, 2013

(54) TELECOMMUNICATION REDIRECT SYSTEM AND METHOD

(75) Inventors: Anthony Pike, Purcellville, VA (US); Padma Valluri, Ashburn, VA (US); Patrick McGregor, Millesville, MD (US)

(73) Assignee: Computer Sciences Corporation, Falls Church, VA (US)

( * ) Notice: Subject to any disclaimer, the term of this patent is extended or adjusted under 35 U.S.C. 154(b) by 1248 days.

(21) Appl. No.: 12/269,368

(22) Filed: Nov. 12, 2008

(65) Prior Publication Data

US 2010/0119047 A1    May 13, 2010

(51) Int. Cl.
 *H04M 3/42* (2006.01)
(52) U.S. Cl.
 USPC ..................... 379/211.02; 370/352
(58) Field of Classification Search
 USPC ..................... 379/211.02; 370/352
 See application file for complete search history.

(56) References Cited

U.S. PATENT DOCUMENTS

| | | | |
|---|---|---|---|
| 2004/0001517 A1* | 1/2004 | Lamberton et al. | 370/522 |
| 2004/0170267 A1* | 9/2004 | Seligmann | 379/211.01 |
| 2007/0115943 A1* | 5/2007 | Perez Hernandez et al. | 370/352 |
| 2009/0150959 A1* | 6/2009 | Jerding et al. | 725/116 |
| 2012/0072714 A1* | 3/2012 | Grandcolas et al. | 713/155 |

\* cited by examiner

*Primary Examiner* — Creighton Smith
(74) *Attorney, Agent, or Firm* — Meyertons, Hood, Kivlin, Kowert & Goetzel, P.C.; Eric B. Meyertons

(57) ABSTRACT

Provided is a method that includes receiving a redirect request from one or more switches of a telecommunications network, receiving, from one or more switches of the telecommunications network, a connect request that requests connection of a transmitter device to a receiver device associated with the normal subscriber number, and configuring the telecommunication network to connect the transmitter device to a receiver device associated with the modified subscriber number, independently of the switch serving the normal receiver device being operable or inoperable. The redirect request comprises a normal subscriber number and a modified subscriber number.

25 Claims, 5 Drawing Sheets

| INDEX | NORMAL SUBSCRIBER NUMBER | MODIFIED SUBSCRIBER NUMBER |
|---|---|---|
| 0 | (222) 818-4206 | (333) 729-4534 |
| 1 | (222) 222-2222 | (444) 222-2424 |
| 2 | (444) 333-3333 | (555) 765-4321 |
| 3 | (777) 444-4444 | (998) 987-6543 |
| 4 | * | * |
| 5 | * | * |
| 6 | * | * |
| 7 | * | * |
| 8 | * | * |
| 9 | * | * |

FIG. 3

TELECOMMUNICATION REDIRECT SYSTEM AND METHOD

BACKGROUND

1. Field of the Invention

The present invention relates generally to telecommunications, and more particularly to a system and method to redirect centrally authenticated service calls.

2. Description of Related Art

Currently, there are several types of telecommunication systems that are configured to route calls from one telecommunication device (e.g., telephone) to another. Telecommunication systems typically include a telecommunication network formed from multiple interconnected routers (e.g., switches) that are configured to route calls from one device to another. A call may be generated at a one device, routed by one or more of the switches, and received at another device.

Generally, each switch of the network is designed to route a limited number of calls simultaneously. Thus, where the capacity of one router is exceeded, that particular router may not be able to forward a call, and the telecommunication system may route the call via another router. If no other routers are available to complete the call, however, the network may be unable to connect the call. Accordingly, the capacity of each switch may define a total call capacity for the telecommunication network. Certain calls may not be completed when the capacity of the network is exceeded.

Network traffic is most likely to exceed the network's capacity when there is an abnormally high call volume routed to specific locations within the network or when inoperable switches diminish the capacity of the network. For instance, during and after a natural disaster, terrorist attacks, or other threats to national security, the call volumes to a specific region of the network may increase. Further, in the wake of a disaster one or more switches may be physically damaged and/or rendered completely inoperable. Circumstances such as these can limit the capacity of the network. For instance, following a hurricane or a terrorist attack in which several switches are physically destroyed, the available connections may be limited as calls are routed around the inoperable switches and redirected through the operable switches, thereby, overwhelming the operable switches. Further, where the switch servicing a particular set of telephone devices is inoperable, those telephones may be completely inaccessible from the network. These situations can be frustrating to callers and may prevent critical calls from being completed. The detrimental effects may be exacerbated in the wake of a disaster when call volumes spike and emergency responders (e.g., government officials, military personnel, or the like) are unable to complete calls regarding disaster relief efforts. One solution may include forwarding calls to different locations. Unfortunately, conventional call forwarding may not be available when the switch that normally serves a device is inoperable.

SUMMARY

Various embodiments of a telecommunication system and method are provided. In one embodiment, a method includes receiving a redirect request from one or more switches of a telecommunications network. The redirect request comprises a normal subscriber number and a modified subscriber number. Further, the method includes receiving, from one or more switches of the telecommunications network, a connect request that requests connection of a transmitter device to a receiver device associated with the normal subscriber number, and configuring the telecommunication network to connect the transmitter device to a receiver device associated with the modified subscriber number.

In one embodiment, a method includes receiving a redirect request from one or more switches of a telecommunications network. The redirect request comprises a normal subscriber number and a modified subscriber number. Further, the method includes receiving, from one or more switches of the telecommunications network, a connect request that requests connection of a transmitter device to a receiver device associated with a requested number, and assessing if the requested number matches a normal subscriber number. The switch from which the redirect request is received may be, but is not necessarily, the switch serving the receiver device associated with the normal subscriber number. If the requested number matches the normal subscriber number, configuring the telecommunication network to connect the transmitter device to a receiver device associated with the modified subscriber number. If the requested number does not match the normal subscriber number, configuring the telecommunication network to connect a transmitter device to a receiver device associated with the normal subscriber number.

In another embodiment, a method includes receiving, at an application server of a telecommunications network, a request to connect a subscriber device to a subscriber device associated with a normal subscriber number. The method includes scanning a list to locate the normal subscriber number, wherein the list is configured to comprise a plurality of normal subscriber numbers and a plurality of modified subscriber numbers associated with the plurality of normal subscriber numbers. If the normal subscriber number is located by scanning the list, the method includes providing an output configured to configure the network to connect the subscriber device to a subscriber device associated with a modified subscriber number associated with the normal subscriber number.

Another embodiment includes a computer-readable medium comprising program instructions stored thereon, wherein the program instructions are computer-executable to implement method including: receiving a redirect request from one or more switches of a telecommunications network. The redirect request comprises a normal subscriber number and a modified subscriber number. Further, the method includes receiving, from one or more switches of the telecommunications network, a connect request that requests connection of a transmitter device to a receiver device associated with the normal subscriber number, and configuring the telecommunication network to connect the transmitter device to a receiver device associated with the modified subscriber number. The switch from which the redirect request is received may be, but is not necessarily, the switch serving the receiver device associated with the normal subscriber number.

In another embodiment, a telecommunication system includes a plurality of switches interconnected to one another, a plurality of subscriber devices comprising at least one transmitter device and at least one receiver device, one or more databases, and one or more application servers. One or more of the plurality of switches is disposed between the application server and each of the subscriber devices. Further at least one of the one or more application servers is configured to receive a redirect request from one or more switches of a telecommunications network wherein the redirect request includes a normal subscriber number and a modified subscriber number, receive, from one or more switches of the telecommunications network, a connect request that requests connection of a transmitter device to a receiver device associated with the normal subscriber number; and to configure the telecommunication network to connect the transmitter device to a receiver device associated with the modified subscriber number.

In yet another embodiment, a method includes receiving a redirect request from one or more switches of a telecommunications network. The redirect request comprises a normal subscriber number and a modified subscriber number. The method also includes receiving, from one or more switches of the telecommunications network, a connect request that requests connection of a transmitter device to a receiver device associated with the normal subscriber number. The switch from which the redirect request is received may be, but is not necessarily, the switch serving the receiver device associated with the normal subscriber number. Further, the method includes receiving, from one or more switches of the telecommunications network, an authentication. The authentication comprises a status associated with the connect request. The method also includes ranking the status among other available statuses, setting a connect threshold, and granting the connect request when the status is ranked equal to or above a connect threshold and refusing or delaying granting the connect request when the status is ranked below the connect threshold. Granting the connect request includes configuring the telecommunication network to connect the transmitter device to a receiver device associated with the modified subscriber number.

BRIEF DESCRIPTION OF THE DRAWINGS

Advantages of the present invention will become apparent to those skilled in the art with the benefit of the following detailed description and upon reference to the accompanying drawings in which:

FIG. 3 is a table that illustrates redirect data of the telecommunication network in accordance with one or more embodiments;

Figure 1:
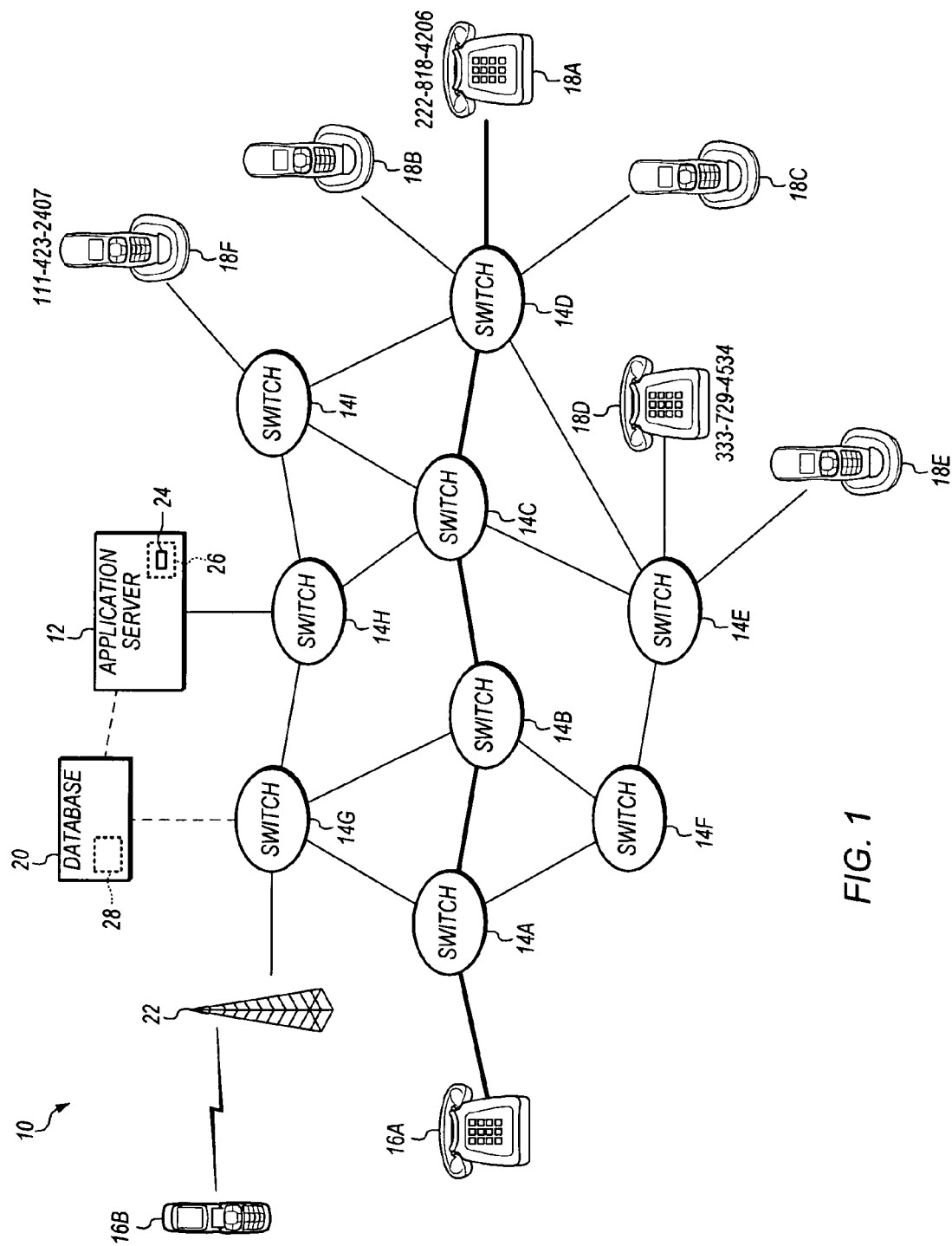
FIG. 1 is a diagram that illustrates a telecommunication network in accordance with one or more embodiments.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF ILLUSTRATIVE EMBODIMENTS

The following discloses embodiments of a system and method by which subscribers to a telecommunication service that includes central per-all authentication and authorization may have calls from other subscribers redirected to a new location. Such embodiments may provide continuity of communications during disaster conditions and network outages in which a switch that normally serves a subscriber and/or other parts of the network is damaged and could otherwise prevent calls from reaching the subscriber via the switch. In some embodiments, the telecommunication network includes a plurality of interconnected switches that can be configured to connect calls from one telephone device to another. In certain embodiments, the network includes an application server that is configured to regulate certain operations of the network, including completion of calls/requests. In some embodiments, when a call is placed, authentication information is forwarded to the application server for authentication before the call is completed. In certain embodiments, the application server assesses the dialed number to determine whether the call should be completed to the dialed number or redirected to another number. In embodiments, the application server assesses whether the call should be redirected based on redirect data. In some embodiments, the redirect data includes one or more normal numbers and a redirect (e.g., modified) number associated with the normal number. In certain embodiments, the application server scans the redirect data to determine if the dialed number matches one of the normal numbers stored in the redirect data. In some embodiments in which the dialed number matches a normal number in the redirect data, the call is redirected and completed to the redirect number as opposed to the dialed number. In some embodiments in which there is not a match, the call is completed to the dialed number. In certain embodiments, the redirect data is stored on the application server or in a database. In one embodiment, the redirect data is stored on one or more redundant databases.

In some embodiments, the application server acquires the redirect data prior to redirecting a call. In certain embodiments, a subscriber of the network submits a redirect request that includes the redirect data. In certain embodiments, the redirect request notifies the network and/or the application server that calls requesting a connection to a number (e.g., a normal number) should be rerouted to another number (e.g., a modified number). In certain embodiments, the redirect request is placed from a telephone that is not located on the same switch (e.g., exchange) as a telephone associated with the normal number. Thus, in certain embodiments, calls can be forwarded to the redirect number even when the switch that is directly coupled to the device associated with the normal number is inoperable. Certain embodiments are discussed in more detail below with regard to an exemplary telecommunication system.

FIG. 1 depicts a telecommunication system/network 10 in accordance with embodiments of the present technique. The telecommunication network 10 includes several interconnected components, including an application server 12, routers 14A-14I, subscriber devices including transmitter devices 16A-16B and receiver devices 18A-18F, a database 20, and a base station 22. The network 10 is typically configured to route calls from one device to another within the network 10. For example, a subscriber may place a call from one of the transmitter device 16A or 16B and the call may be routed via one or more of the switches 14A-14I to one of the receiver devices 18A-18F. As used herein, "subscriber" refers to a person or device (e.g., a user) that desires to transmit and/or receive voice and/or data communications via the telecommunication network 10.

In one embodiment, the network 10 may include a circuit switched telecommunication network. In a circuit switched network, the network 10 may establish a fixed bandwidth circuit (or channel) between nodes and terminals (e.g., switches 14A-14I) before the users may communicate, as if the nodes were physically connected with an electrical circuit. In another embodiment, the network 10 may include a packet switched telecommunication network. In a packet switched network, packets (discrete blocks of data) are routed between nodes over data links shared with other traffic. In each network node, packets are queued or buffered, resulting in variable delay. This contrasts with circuit switching, which sets up a limited number of constant bit rate and constant delay connections between nodes for their exclusive use for the duration of the communication.

The application server 12 may be configured to address (e.g., receive, process and respond to) requests received from one or more devices of the telecommunication system 10. In one embodiment, the application server 12 includes a software engine that delivers applications and/or data associated with applications to client devices, such as the routers 14A-14I, the transmitter devices 16A and 16B and the receiver devices 18A-18F. The application server 12 may include application software 24 configured to run various software routines. In one embodiment, the application software 24 may include applications that regulate one or more operations of the network 10. The application software may be stored on a computer readable 26 medium of the application server 12 or a computer readable medium located elsewhere within the network 10. The application software 24 may be stored on a computer readable medium 26 of the network 10. In one embodiment, the application server 12 includes the computer readable medium 26.

The application server 12 may be configured to receive a request, assess the request, determine an appropriate course of action, and issue a command to one or more devices of the telecommunication network 10 that are configured to implements an appropriate response to the request. For example, as discussed in further detail below, the application server 12 may receive a request to connect a call (e.g., a connect request) and, in response, the application server 12 may access privileges of the user, assess the condition of the routers 14A-14I of the network 10, determine whether a connection can/should be established, and generate a response/output that is configured to enable connection of the call based on the assessment. As used herein, "connect request" refers to a request by a subscriber to connect a transmitter device to a receiver device via the network 10. In another embodiment, the application server 12 may be configured to receive a request to forward calls (e.g., a redirect request) and, in response, set various parameters within the network 10 to ensure that future connect requests are handled in accordance with the redirect request. As used herein, "redirect request" refers to a request to redirect connections to a modified subscriber device (e.g., a subscriber device associated with the modified subscriber number), such that when a connect request is received that requests connection of a transmitter device to a receiver device (e.g., a normal receiver device), the network 10 is configured to route the call to the modified receiver device (e.g., a receiver device that is different from the normal receiver device). Various requests handled by the application server 12 are discussed in more detail below. As used herein, the term "modified" refers to the association of a subscriber device to a modified subscriber number and does not refer to an alteration or physical characteristic or modification of the subscriber device.

In the illustrated embodiment, the application server 12 is coupled to the database 20. In such an embodiment, the application server 12 may exchange data directly with the database 20. For example, in one embodiment, where a redirect request is received, the application server 12 may store in the database 20 redirect data associated with the request. As a further example, where a connect request is received, the application server 12 may query the database 20 to retrieve the redirect data or other data associated with the connect request, and provide a connection in accordance with a prior redirect request.

Although the illustrated embodiment depicts a single application server 12, the network 10 may include a plurality of application servers 12, in one embodiment. For example, an additional application server 12 may be coupled to another switch of the telecommunication network 10 (e.g., switch 14F). In such an embodiment, the application servers may function in coordination with one another to receive, process and/or respond to network request (e.g., connect request). For example, in one embodiment, the first application server may be configured as a primary application server and the second application may be configured as a back-up application server. In such an embodiment, the back-up application server may receive, process, or respond to requests when the primary application server is busy, unavailable, or otherwise unable to handle the requests. In another embodiment, the application servers may be configured for regional support. In such an embodiment, a first application server may address requests generated at a first set of one or more switches, and a second application server may address requests generated at a second set of one or more switches. In other embodiments, each of the application servers may be configured to share the duty of addressing each of the requests, and/or may be reserved for addressing one or more specific types of request (e.g., connect request or redirect request).

Routers 14A-14I (hereafter referred to as switches) are configured to route calls from one device of the network 10 to another. In certain embodiments, each switch 14A-14I includes a system of electronic components that are configured to connect (e.g., forward) phone calls within the network 10. Each of the switches 14A-14I may be housed in a central office building that contains the switches and related systems that enable the connections and relaying of information across the telecommunications network 10. An area served by a particular switch may be referred to as an exchange. For example, in the depicted embodiment, the switch 14D serves local devices 18A-18C and, as such, the area including the devices 18A-18C may be referred to as the exchange of switch 14D.

Generally, the telecommunication network 10 may include a plurality of interconnected switches 14A-14I that are configured to provide one or more contiguous paths between each of the transmitter devices 16A and 16B and the receiver devices 18A-18F. The switches 14A-14I are typically connected to one another via couplers that extend between each of the switches 14A-14I. The couplers may include a hard-wired connection, a wireless connection, or a combination thereof. As used herein, "hard-wired connection" may refer to a physical connection via metal wire, optical fiber, cable or the like. A "wireless connection" may refer to a connection via airwaves or other wireless means, and/or not having a physical connection via a metal wire, optical fiber, cable or the like.

Each switch 14A-14I can be operated to forward a call, a request, or other data transmitted from one device to another. For instance, in the illustrated embodiment, the transmitter device 16A can be connected to the receiver device 18A via the path defined by switches 14A-14D and their respective couplers.

The telecommunication network 10 includes subscriber devices 16A, 16B and 18A-18F. Each of these subscriber devices may be used to place and/or receive network request (e.g., calls), in one embodiment. Typically designation of these devices as transmitter devices and/or receiver devices depends on the nature of a call or request. For example, where a subscriber device is used to place a call/request, it may be referred to as a transmitter device. That same device, however, may be referred to as a receiver device when used to receive a call/request. For simplicity, in the illustrated embodiment of FIG. 1 each of the subscriber devices has been labeled as a transmitter device 16A-16B or a receiver device 18A-18F, and will remain as such throughout the remainder of this discussion.

The transmitter devices 16A and 16B include devices configured such that a user may place a request (e.g., a call) to the telecommunication network 10. A request typically includes a request to connect the requesting device 16A or 16B to one or more of the receiving devices 18A-18F. In certain embodiments, the transmitter device 16A or 16B includes a telephone handset. As depicted in FIG. 1, the transmitter device 16A includes a landline subscriber device as indicated by the hard-wired coupler extending between the transmitter device 16A and the switch 14A. As used herein, a "landline subscriber device" refers to a subscriber device that is hard-wired (e.g., directly coupled) to the telecommunication network 10 via a solid medium, such as a wire or optical fiber. A landline subscriber device may include a telephone, fax machine, alarm system, or the like that is configured to connect directly to a telephone outlet/jack coupled to the network 10. Further, as depicted in FIG. 1, the transmitter device 16B includes a wireless subscriber device, such as a mobile/cellular phone. As used herein, a "wireless subscriber device" refers to a subscriber device that is that is coupled to the telecommunications network 10 via airwaves or another wireless means, and/or is not hard-wired to the telecommunication network 10 via a solid medium, such as a wire or optical fiber. For instance, in the illustrated embodiment, the transmitter device 16B is coupled to the telecommunications network 10 via airwaves that are received at the base station 22. The base station 22 may include an antenna, such as a cellular phone antenna tower, configured to communicate wirelessly with wireless subscriber devices (e.g., transmitter 16B). In one embodiment, the base station 22 is hard-wired to the switch 14G; however, the base station 22 may be coupled to the telecommunications network 10 via one or more other wireless connections, such as additional base stations 22. The additional base stations 22 may transmit signals in series and/or in parallel between the wireless subscriber device (e.g., transmitter 16B) and the switch (e.g., switch 14G) that services the wireless subscriber device. Further, some embodiments may include multiple base stations distributed throughout the network 10. A wireless subscriber device may be capable of connecting between the multiple base stations, thereby enabling mobility that is traditionally not associated with landline subscriber devices that are hard-wired to the telecommunications network 10.

In the illustrated embodiment, the telecommunications network 10 includes the database 20. The database 20 may include a storage medium 28 that is configured to house a collection of records or data. In one embodiment, the database 20 is hard-wired and/or wirelessly coupled to the application server 12. In such an embodiment, the application server 12 may transmit and/or receive data to and from the database 20. For example, the application server 12 may forward information to be stored on the storage medium 28 of the database 20. Further, the application server 12 may query the database 20 for data, including information relating to access privileges of a user, a set of pre-configured switching arrangements, a pre-selected redirect solution, or the like. As further illustrated, the database 20 may be coupled to a switch (e.g., switch 14G) via a hard-wired or wireless connection. In such an embodiment, the database 20 may be configured to connect to a subscriber device without the connection being routed through the application server 12. Further, the application server 12 and the database 20 may be coupled to one another via an alternate path in an embodiment where the database 20 is not directly coupled to the application server 12 or a direct connection is otherwise unavailable. For example, in the illustrated embodiment, the application server 12 and the database 20 may be coupled to one another and communicate via a path that extends through switches 14G and 14H.

Although the illustrated embodiment depicts a single database 20, other embodiments of the telecommunication network 10 may include a plurality of databases 20 and/or the database 20 may include a distributed database coupled to the telecommunication network 10. As used herein, "distributed database" refers to a database that is under the control of a central database management system (DBMS) in which storage devices are not all directly attached to a common central processing unit. In such an embodiment, the database 20 may include in multiple storage devices (e.g., hard-drives, computers, or the like) located in the same physical location, or may be dispersed over a network of interconnected storage devices. Thus, collections of data stored by the database 20 can be distributed across multiple storage devices at different physical locations. In one embodiment, the database 20 includes a distributed database coupled to the network 10 at a single access point (e.g., switch 14G or the application server 12). In another embodiment, the database 20 may be coupled to the network 10 at multiple locations, and/or may include one or more physically separate databases that are coupled to the network 10 at one or more access points. For example, in one embodiment, the network 10 may include a plurality of databases 20 located proximate and coupled to switches 14G, 14F, and 14E. Such an embodiment may enable physically locating the databases 20 in different regions (e.g., states, cities, districts) of the network 10. Thus, where a localized disaster renders one of the databases 20 inoperable, the other databases 20 may remain operable and allow the network 10 to continue operating without significant impairment.

In one embodiment including multiple databases 20, each of the plurality of distributed databases 20 may store distinct data that is different from the data stored in the other databases 20 and/or other storage devices. In another embodiment, one or more of the distributed databases 20 may store redundant data (e.g., replicated data stored on one or more of the other storage devices). Such an embodiment may provide a robust network 10 that is capable of accessing all of the data in the event one or more of the databases 20 fail.

As discussed briefly above, operation of the network 10 may include receiving a connect request and connecting a call to a receiver device 18A-18F associated with the request. In certain embodiments, it may be desirable to permit a subscriber to the network 10 to have calls that are destined for one receiver device (e.g., their telephone) redirected (e.g., forwarded) to another receiver/transmitter device. Such a technique may be desirable in the wake of a disaster or emergency that renders their normal receiver device inoperable. This may include situations in which the switch servicing the receiver device is damaged or destroyed, and the normal receiver device and other receiver devices on the exchange are inoperable. It is noted that in the illustrated embodiment, there is a level of separation between the subscriber devices and the application server 12. The level of separation may be provided by one or more switches 14A-14I that are coupled between the application server 12 and each of the subscriber devices. For instance, in the illustrated embodiment, at least one switch is located between the application server 12 and each of the transmitter devices 16A and 16B and receiver devices 18A-18F. Accordingly, where a switch (e.g., 14D) servicing an exchange (e.g., receiver devices 18A-18C) is inoperable, a redirect request can be generated by a subscriber and received by application server 12 via an alternate switch (e.g., switch 14E). In traditional call forwarding, this may not be possible as the switch for an exchange typically handles call-forwarding request for that exchange. Thus, in traditional call forwarding, when the switch is inoperable, subscribers on that exchange may not be able to access the switch and, thus, cannot forward calls to other subscriber devices within the network 10.

Figure 2:
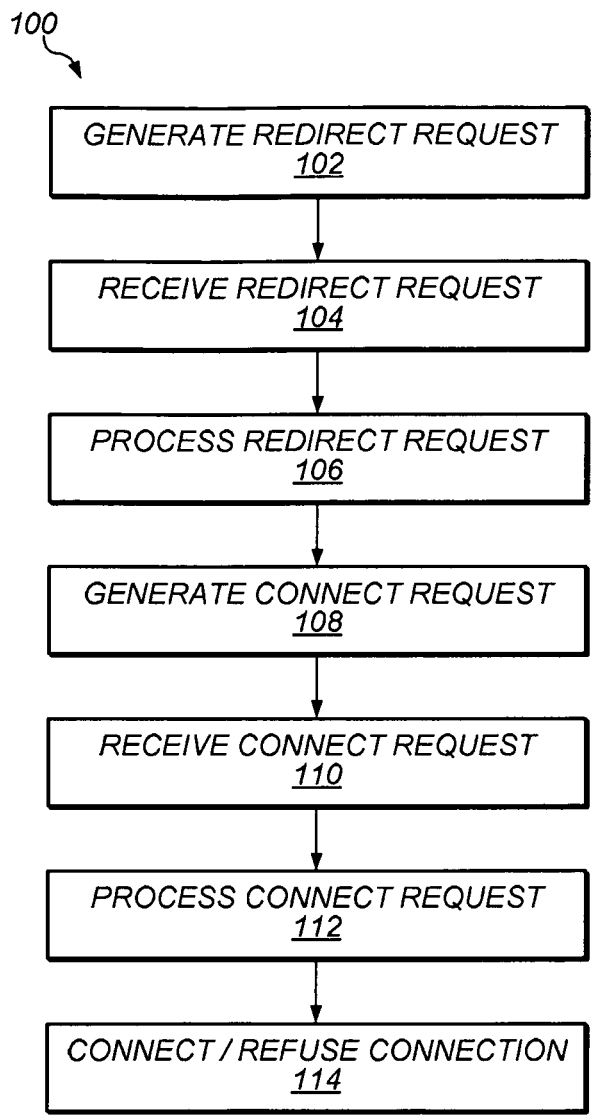
FIG. 2 is a flowchart that illustrates a method of operating the telecommunication network in accordance with one or more embodiments.

FIG. 2 is a flow chart that illustrates a method 100 of operating the telecommunication network 10, in accordance with one or more embodiments. As is discussed in further detail below, the method 100 generally includes generating a redirect request, receiving the redirect request, and processing the redirect request. Further, the method 100 may include generating a connect request, receiving a connect request, processing the connect request, and completing or refusing a connection. Accordingly, the method may enable one subscriber to submit a request to the application server 12 to forward their calls, and subsequent calls from other subscribers may be forwarded by the application server 12.

The method 100 includes generating a redirect request, as depicted at block 102. Generating a redirect request may include a subscriber transmitting a request to the application server 12 via the network 10. The subscriber may include a person who is using the subscriber device to place the request, or a device, such as a computer, placing the request at the subscriber device. In one embodiment, a subscriber desiring to forward their calls to another subscriber device may generate the redirect request to alert the network 10 that calls to their normal telephone should be redirected to another (e.g., modified) telephone.

In one embodiment, generating the redirect request (block 102) may include the subscriber submitting (e.g., dialing) a service invocation (e.g., a code) that is configured to alert the application server 12 to the subscriber's desire to forward calls, followed by submitting the normal subscriber number and a modified subscriber number. As used herein, "normal subscriber number" is a number where the subscriber can typically be reached and/or a number associated with a normal subscriber device. As used herein, "modified subscriber number" is a number where the subscriber desires to be reached and/or a number associated with a modified subscriber device. As used herein, "normal subscriber device" refers to a subscriber device normally associated with the subscriber generating the redirect request and/or a subscriber device associated with a normal subscriber number. As used herein, the term "normal" refers to the association of a subscriber device to a normal subscriber number and does not refer to an alteration or physical characteristic or modification of the subscriber device. As used herein, "modified subscriber device" refers to a subscriber device where the subscriber desires a connection to be redirected to and/or a subscriber device associated with a modified subscriber number. As used herein, the term "modified" refers to the association of a subscriber device to a modified subscriber number and does not refer to an alteration or physical characteristic or modification of the subscriber device.

In one embodiment, a subscriber enters a service invocation (e.g., a code "*10") to initiate the redirect request, followed by dialing the normal subscriber number (e.g., 222-818-4206) associated with the normal subscriber device (e.g., receiver device 18A) and dialing a modified subscriber number (e.g., 333-729-4534) associated with the modified subscriber device (e.g., receiver device 18A). Other embodiments may include alternative ways to generate the redirect request that is received by the network 10. For example, the network 10 may prompt the subscriber to provide an "action code." When the subscriber provides the action code associated with a redirect request, the network 10 may prompt the user for each of the normal subscriber number and the modified subscriber number.

In some embodiments, the redirect request can be generated from any one of the subscriber devices coupled to the network 10. For instance, in one embodiment, the redirect request may be generated from the normal subscriber device (e.g., receiver device 18A) or another subscriber device on the same exchange. Such an embodiment may require that the subscriber device and the switch that services the subscriber device (e.g., switch 14D) be operational. In another embodiment, the redirect request may be generated from a subscriber device other than the normal subscriber device. Accordingly, the switch receiving the request may be, but is not necessarily, the switch serving the normal receiver device associated with the normal subscriber number. For example, in one embodiment, the redirect request may be generated from a subscriber device on another exchange (e.g., receiver device 18D). Such an embodiment may be advantageous where the switch servicing the normal receiver device is inoperable. For instance, where the switch 14D associated with the normal receiver device 18A is physically damaged, a subscriber may locate another subscriber device (e.g., the receiver device 18E or 18D) on an exchange associated with an operable switch (e.g., switch 14E), submit a redirect request via the subscriber device (e.g., the receiver device 18E or 18D), and continue to receive and place calls via the modified subscriber device (e.g., the receiver device 18E or 18D).

The method 100 may include receiving the redirect request, as depicted at block 104. In one embodiment, the redirect request is transmitted over switches of the network 10 and received by the application server 12. For instance, in the embodiment illustrated in FIG. 1, a redirect request generated by a subscriber at the receiver device 18A may be routed to the application server 12 via switches 14D, 14C and 14H and their respective couplers. Similarly, where the redirect request is generated at the receiver device 18E, the redirect request may be routed to the application server 12 via the switches 14E, 14C, and 14H and their respective couplers.

Further, the method 100 may include processing the redirect request, as depicted at block 106. In certain embodiments, processing the redirect request may include identifying the request as a redirect request, assessing various portions of the redirect request and storing redirect data associated with the redirect request.

In one embodiment, identifying the redirect request includes assessing the incoming request for one or more characteristics that are indicative of the request type. For example, when the redirect request is received at the application server 12, the application server 12 may employ application software configured to parse a portion of the redirect request for the service invocation that is indicative of a request type. Such an invocation may be referred to as a redirect invocation.

In one embodiment, the service invocation may include the first three digits submitted/dialed by a subscriber. The subscriber may dial a three-digit action code that is configured to alert the network 10 to the nature of the incoming request, and the three digits of the request may be used to identify the redirect request. For example, in accordance with the embodiment discussed above with regard to generating the request, depicted at block 102, in which the subscriber enters a code "*10" to initiate the redirect request, followed by dialing the normal subscriber number (e.g., 222-818-4206) associated with the normal subscriber device (e.g., receiver device 18A) and dialing a modified number (e.g., 333-729-4534) associated with the modified subscriber device (e.g., receiver device 18A), the application server 12 may identify the service invocation as a redirect invocation based on the digits "*10".

Assessing various portions of the redirect request may include assessing the redirect request to determine redirect data associated with the redirect request. In one embodiment, the redirect data includes a normal subscriber number and a modified subscriber number. In such an embodiment, assessing the redirect request may include parsing the normal subscriber number and the modified number from the redirect request. For example, in one embodiment, the subscriber may submit/dial a series of numbers including the service invocation, followed by the normal subscriber number and the modified subscriber number. In such an embodiment, the application server 12 may employ application software configured to identify the redirect invocation via the first three dialed digits, determine the normal subscriber number from the following series of digits and the modified subscriber number from the last series of digits, or vice versa. For example, in accordance with the embodiments discussed above with regard to generating the request, depicted at block 102, in which the subscriber enters a code "*10" to initiate the redirect request, followed by dialing the normal subscriber number (e.g., 222-818-4206) associated with the normal subscriber device (e.g., receiver device 18A) and dialing a modified number (e.g., 333-729-4534) associated with the modified subscriber device (e.g., receiver device 18A), the normal subscriber number is identified as 222-818-4206 and the modified subscriber is identified as 333-729-4534.

Further, processing the redirect request may include storing the redirect data, as mentioned above. In one embodiment, the redirect data refers to data that is obtained from or otherwise associated with the redirect request. For example, the redirect data may include the normal subscriber number and the modified subscriber number. Accordingly, in one embodiment, storing redirect data may include the application server 12 executing application software configured to store the subscriber number and the modified subscriber number. The normal subscriber number may be stored in direct or indirect association with the modified subscriber number, in one embodiment.

FIG. 3 illustrates one embodiment of the redirect data stored in table form. In the illustrated embodiment, the table includes three columns. A column reserved for the index of the redirect data, a column reserved for a normal subscriber number, and a column reserved for a modified subscriber number. The index column provides an index associated with a row of data. Each row of data may be associated with a particular request. For example, in the illustrated embodiment, each row includes a normal subscriber number associated with a redirect request and a modified subscriber number associated with the same redirect request. As evidenced by the four rows including data, redirect data associated with at least four redirect requests have been received at the application server 12. For example, the index row 0 includes a normal subscriber number 222-818-4206 that may be associated with receiver device 18A (See FIG. 1) and a modified subscriber number 333-729-4534 that may be associated with the receiver device 18D.

In one embodiment, redirect data is stored on the storage medium 26 of the application server 12. In another embodiment, the redirect data may be transferred to a storage medium that is separate from the application server 12. For example, the application server 12 may be configured to store the redirect data on a database, such as the storage medium 28 of the database 20. Accordingly, the database 20 may be configured to store redirect data associated with one or more redirect requests such that scanning the database for a normal subscriber number may enable locating a modified subscriber number associated with the normal subscriber number.

In one embodiment, the application server 12 includes software configured to receive and process an ADD command. The ADD command stored on the application server 12 may be capable of conducting the method steps associated with generating a redirect request, receiving a redirect request, and processing a redirect request, as depicted at blocks 102-106. For example, the ADD command may be prompted by the receipt of the redirect request and may provide for retrieving data from the subscriber as well as storing the redirect data associated with the redirect request.

The method 100 may include generating a connect request, as depicted at block 108. Generating the connect request may include a subscriber and/or a subscriber device transmitting a request to the application server 12 via the network 10. The subscriber may include a person who is using the subscriber device to place the request, or a device, such as a computer, placing the request at the subscriber device. For example, in one embodiment, a subscriber desiring to place a call from one subscriber device to another subscriber device may generate a connect request to alert the network 10 of the desire to place a call and to provide connect data that is configured to indicate where and how the call should be placed.

In one embodiment, generating the connect request may include the subscriber submitting (e.g., dialing), at one subscriber device, a number associated with another subscriber device the subscriber desires to call. For example, in accordance with the embodiment illustrated in FIG. 1, a subscriber who desires to connect to the receiver device 18A may place a call at the transmitter device 16A by dialing the number 222-818-4206. Other embodiments may include additional entries by the subscriber. For example, in one embodiment, the subscriber may dial a three-digit service invocation (e.g., a code "*11") that is indicative of a connect request type.

The method 100 may include receiving the connect request, as depicted at block 110. In one embodiment, the connect request is transmitted over the network 10 and received by the application server 12. For instance, in the embodiment illustrated in FIG. 1, the connect request generated by the subscriber at the transmitter device 16A may be routed to the application server 12 via switches 14A, 14G and 14H and their respective couplers.

Further, the method 100 may include processing the connect request, as depicted at block 112. In certain embodiments, processing the connect request may include identifying the request as a connect request, assessing various portions of the connect request and determining how the connect request should be handled.

In one embodiment, identifying the connect request includes assessing the incoming request for one or more characteristics that are indicative of the request type. For example, when the connect request is received at the application server 12, the application server 12 may employ application software configured to parse a portion of the connect request for a service invocation that is indicative of a connect request type. Such an invocation may be referred to as a connect invocation. In one embodiment, the service invocation may include the first three digits submitted/dialed by a subscriber. The subscriber may dial a three-digit action code that is configured to alert the network 10 to the nature of the incoming request, and the first three digits of the request may be used to identify the connect request. For example, in accordance with the embodiment discussed above with regard to generating the connect request, depicted at block 108, where the subscriber enters a code "*11" to initiate the connect request, followed by dialing the request number (e.g., 222-818-4206), the application server 12 may identify the service invocation as a connect request based on the digits "11". In another embodiment, in which the subscriber dials only the requested number, the absence of the service invocation may be indicative of a connect request type.

Assessing various portions of the connect request may include assessing the connect request to determine connect data associated with the connect request. In one embodiment, the connect data includes a requested number. In such an embodiment, assessing the connect request may include parsing the requested number from the connect request. For example, in one embodiment, the subscriber may submit/dial a series of numbers including the service invocation, followed by the requested number. In such an embodiment, the application server 12 may employ application software configured to identify the connect invocation via the first three dialed digits, and to determine the requested number from the series of digits that follow. For example, in accordance with the embodiments discussed above with regard to generating the request, depicted at block 102, where the subscriber enters a code "*11" to initiate the connect request, followed by dialing the number 222-818-4206 associated with the receiver device 18A, the requested number is identified as 222-818-4206.

Processing the connect request (block 112) may include assessing whether or not to grant the connect request and/or assessing and determining the proper subscriber device to which to make a connection. For example, the application server 12 may employ application software configured to assess whether or not the requested number is valid (i.e., whether or not an extension exists at the requested number and/or whether or not a receiver device is associated with the requested number). If the requested number is valid, the application server 12 may grant the connection and/or continue to process the connect request. If the requested number is not valid, the application server 12 may refuse the connect request and provide an indication to the subscriber at the transmitter device 16A.

In one embodiment, assessing and determining the proper subscriber device to which to make a connection includes determining whether or not a normal subscriber number of a redirect request and/or redirect data is associated with the requested number. In one embodiment, the application server 12 may employ application software configured to determine whether or not the requested number is associated with a normal subscriber number of a redirect request and/or redirect data is associated with the requested number. In other words, whether or not the connection should be made to the normal subscriber device or to a modified subscriber device. In the embodiment discussed above with regard to FIGS. 1 and 3 and blocks 106 and 108, if the connect request specifies a requested number that matches one of the normal subscribers numbers stored at block 108, then the connection may be made to a subscriber device associated with a modified subscriber number directly associated with the normal subscriber number. For example, where the connect request specifies a requested number of 222-818-4206, the connection may be redirected to the receiver device 18D associated with the modified subscriber number 333-729-4534 instead of being connected to the receiver device 18A associated with the requested number and the normal subscriber number. However, if the connect request specifies a requested number that does not match one of the normal subscriber numbers stored in the table of FIG. 3 at block 108, then the connection may be made to the subscriber device associated with the normal subscriber number and the requested number. For example, where the connect request specifies a request number of 111-423-2407, the connection should be directed to the receiver device 18F associated with the normal subscriber number and the requested number, and should not be redirected.

The method 100 also includes providing a connection or not providing a connection, as depicted at block 114. As discussed above, a connection may include routing a call though a series of the switches 14A-14I to form a contiguous route that connects one subscriber device and another subscriber device. In an embodiment in which it is determined that a connect request should be granted and there is no redirect request associated with the requested number specified in the connect request, the application server 12 may configure a plurality of the switches 14A-14I to provide route of communication between the two respective subscriber devices. For example, a call from transmitter device 16A may be routed through switches 14A, 14B, 14C and 14I to the receiver device 18F associated with the number 111-0423-2407. In another embodiment in which one of the switches is inoperable, the call may be routed around the inoperable switch. For example, in a similar situation where switch 14C is inoperable, a call from transmitter device 16A may be routed through switches 14A, 14G, 14H and 14I to the receiver device 18F associated with the number 111-423-2407.

In an embodiment in which it is determined that a connect request should be granted and there is a redirect request associated with the requested number specified by the connect request, the application server 12 may configure a plurality of the switches 14A-14I to provide a route of communication between the subscriber device where the call is placed and the modified subscriber device. For example, based on a connect request specifying a requested number of 222-818-4206 and a redirect request specifying a normal subscriber number of 222-818-4206 and a modified subscriber number of 333-729-4534, a call from the transmitter device 16A may be routed through switches 14A, 14F and 14E to the modified receiver device 18D associated with the number 333-729-4534. Such an embodiment may be particularly advantageous when the switch 14D is inoperable. For example, in an embodiment in which one of the switches in the route between the subscriber/transmitter device and the modified subscriber/receiver device is inoperable, the call may be routed around the inoperable switch. In a similar situation in which the switch 14F is inoperable, a call from transmitter device 16A may be routed through switches 14A, 14B, 14C and 14E to the receiver device 18D associated with the number 333-729-4534.

The previous discussion includes several embodiments of the method 100. As will be appreciated, the method 100 may be modified to include variations. In one embodiment, the method steps may be arranged in varying order or completed separately. For example, generating, receiving and processing the redirect request (blocks 102, 104, and 106) may occur after generating, receiving, processing, and connecting the connect request (blocks 110, 112 and 114). Further, the method 100 may include additional techniques that include authentication and prioritizing of requested/calls.

In certain embodiments, operation of the network 10 may include authenticating and/or authorizing requested before they are granted. For example, processing the redirect request (block 106) and/or processing the connect request (block 112) may include determining and assessing access privileges. Thus, before a redirect request or a connect request from a subscriber is granted and/or the subscriber devices are connected, the access privileges of the subscriber and/or subscriber device may be verified. If the access privileges are sufficient, the request may be granted. If the access privileges are insufficient, however, the request may be rejected and the connection prohibited. In one such embodiment, the request (e.g., connect request and/or redirect request) may include additional data that is indicative of an authorization code that can be assessed to determine privileges associated with the subscriber placing the request. For instance, in one embodiment the first four digits submitted (e.g., dialed) by a subscriber may be indicative of a personal identification number (PIN), the fourth and fifth digits may be indicative of the service invocation, the next ten digits may be indicative of the requested number or the normal subscriber number and, in the case of a redirect request, the last ten digits may be indicative of the modified subscriber number.

In one embodiment, processing the request (block 106 or 112) may include assessing the access privileges of the subscriber and/or the subscriber device to determine whether or not there are sufficient privileges to grant the connect request. For example, in an embodiment that includes a connect request, a subscriber submits (e.g., dials) from the transmitter device 16A a four digit authentication code (e.g., a personal identification number (PIN)) and the request number (e.g., 222-818-4206) associated with the receiver device 18A. The connect request, including the number of the receiver device 18A and the authentication code is transmitted to the application server 12 via the switches 14A, 14G, and 14H and their respective couplers. In one embodiment, the application server 12 may implement application software configured to assess and determine the authentication code and the requested number. In one embodiment, the application server 12 may verify that the authentication code and/or the transmitter device 16A is associated with sufficient privileges to connect to the receiver device 18A associated with the number. For example, the application server 12 may implement application software that is configured to verify the authorization code. In an embodiment in which the authorization code is verified, the application server 12 may respond by configuring the switches 14A, 14B, 14C and 14D of the network 10 to provide a connection between the transmitter device 16A and the receiver device 18A associated with the requested number, or with a modified receiver device. Other embodiments, may include separate procedures for assessing the authentication code and number associated with the connect request. For example, the telecommunications network 10 may prompt the subscriber for an authentication code and assess the authentication prior to allowing the subscriber to enter other numbers associated with the connect request. Such an embodiment may enable assessing whether or not a subscriber has sufficient privileges to access the network 10, regardless the connection request.

A similar technique may be employed for authenticating a redirect request. For example, processing the redirect request (block 106) may include verifying whether or not a subscriber is authorized to make the redirect request. In one embodiment, employing the authentication code may prevent an unknown subscriber from redirecting calls from one subscriber device to another unknown to the subscriber actually associated with the normal subscriber device.

Other embodiments of the method 100 may include processing the connect request and/or the redirect request to determine the priority of the request in relation to other request to the network 10. Such a technique may be beneficial when the capacity of the network 10 is reduced and it is desirable that request of higher importance be completed before request of lower importance. For example, following a natural disaster, conditions in the network 10 may dictate that only calls from certain officials (e.g., politicians and/or military personnel) should be connected. In one embodiment, the authentication code discussed above may be associated with a status of the subscriber or subscriber device. For example, a PIN may be indicative of a user having a federal government status, state government status, local government status, tribal government status, critical industry status, national security status, or emergency preparedness status. Accordingly, processing the connect request may include assessing the access privileges of the subscriber and/or the request to determine the status of the subscriber and/or the request, and to grant or refuse the request based on the status.

The priority may be based on the authentication of the subscriber, the subscriber device used to place the request, the normal number associated with the connect request, the subscriber device expected to receive the call, and/or the current status of the network 10. For instance, where multiple levels of access priority exists, the application server 12 may employ application software configured to assess the request, rank their associated level of privilege and grant the calls of higher priority before granting calls of lower priority. For instance, in one embodiment, connect requests associated with federal government status are granted over connect request associated with state government status, and connect request associated with state government status are granted over connect request associated with local government status, and so forth. In one embodiment, the subscriber device itself (e.g., a telephone) may have a priority associated with it such that any user of the phone can submit a request through the subscriber device. For example, an emergency phone location may be made available such that users can place calls without personally having sufficient priority. Such techniques may help to ensure that the available network capacity is being employed in an efficient manner to enable higher priority calls to be placed over lower priority calls.

In one embodiment, prioritizing calls may be based on the status and/or condition of the network 10. For example, in an embodiment in which the call volume does not exceed network capacity all calls/request may be granted. In an embodiment in which the call volume exceeds a critical level and/or exceeds the network 10 capacity, and/or one or more devices on network 10 are inoperable, prioritization may be employed to regulate the granting of calls/requests.

Figure 4:
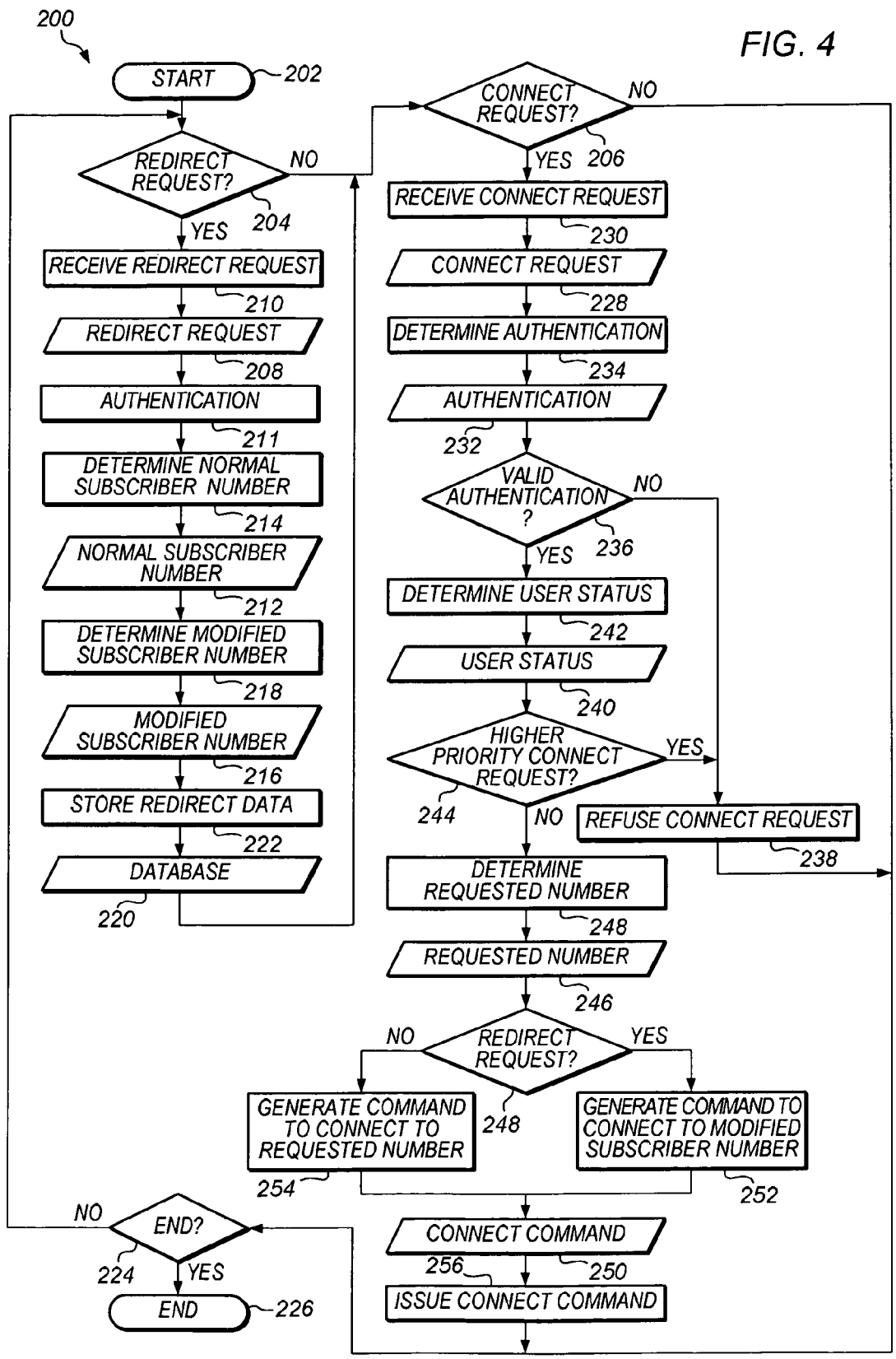
FIG. 4 is a flowchart that illustrates a method of operating the telecommunication network in accordance with one or more embodiments.

FIG. 4 is a flowchart that illustrates a method 200 of operating the application server 12 in accordance with embodiments of the present technique. In the illustrated embodiment, the method 200 includes starting and checking for a redirect request, as depicted at blocks 202 and 204. The requests may be generated from a subscriber as discussed previously with regard to block 102 of FIG. 2. In one embodiment, the application server 12 is configured to poll communications/signals/data from devices on the network 10 to determine whether a redirect request has been directed to the application server 12. In one embodiment, the application server 12 may employ application software configured to check incoming request. In one embodiment, the application software includes an inspect application configured to inspect each request for service invocations, such as those indicative of a redirect request or a connect request.

In one embodiment in which a redirect request has not been generated or transmitted to the application server 12, the method 200 may include checking for a connect request, as depicted at block 206. In an embodiment in which a redirect request is directed to the application server 12, the method 200 may include receiving the redirect request 208, as depicted at block 210. In one embodiment, receiving the redirect request 208 may include receiving a signal/data indicative of the redirect request and storing or queuing the redirect request 208 for subsequent processing. In one embodiment, the application server 12 may implement application software configured to receive the request. For example, in one embodiment, the application software includes a receive application configured to receive, store and/or queue the request for processing. Some embodiments may include techniques similar to those discussed previously with regard to FIG. 2, block 104.

The illustrated embodiment of the method 200 includes authentication, as depicted at block 211. Authentication 211 may be optional in certain embodiments of the method 200. For example, in one embodiment, a redirect request may proceed and be granted without authentication of who or what is generating the redirect request 208. In one embodiment, the redirect request 208 may be authenticated before or during processing of the redirect request. For example, authentication 211 may be performed anywhere in the processing of the redirect request, such as before block 210, after block 216 or 220, or in parallel with one or more of the steps of method 200.

Figure 5:
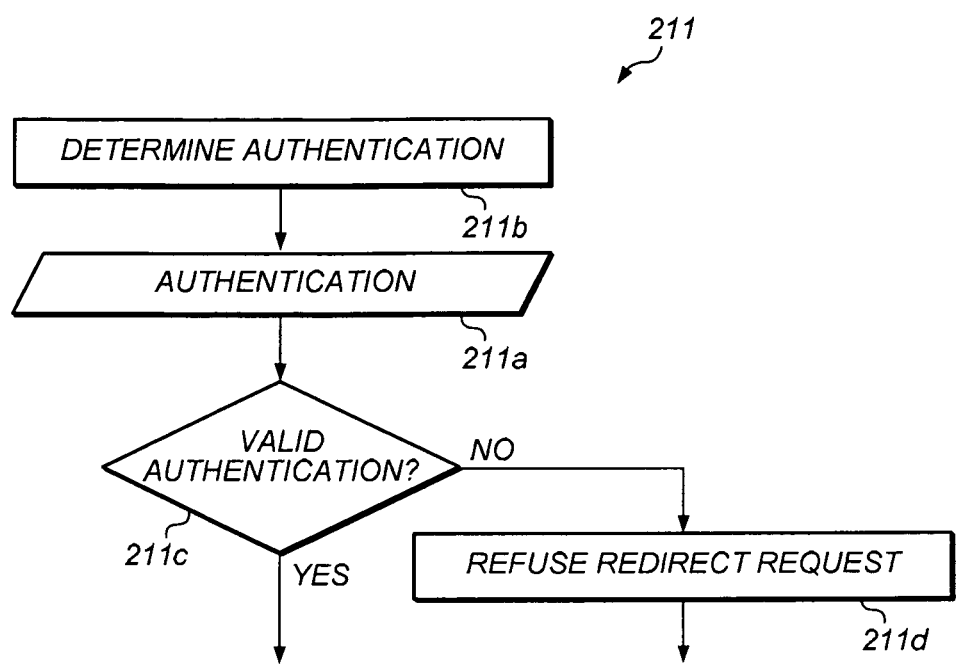
FIG. 5 is a flowchart that illustrates a method of authentication in accordance with one or more embodiments.

In some embodiments, authentication 211 may include several steps and/or considerations. FIG. 5 is a flowchart that illustrates authentication 211 in accordance with one embodiment of the present technique. As depicted in FIG. 5, authentication 211 may include determining an authentication value 211a, as depicted at block 211b. The authentication value 211a may include data that is indicative of access privileges associated with the subscriber and/or the transmitter device that generates the redirect request. In one embodiment, the authentication value 211a may be parsed from the redirect request 208, or provided separately by the subscriber or transmitter device that generated the redirect request. For example, in one embodiment, the application server 12 may implement application software configured to determine the authentication value 211a from the redirect request 208. In one embodiment, the application software 12 may include an authentication application configured to parse the authentication value 211a from the redirect request 208.

Authentication 211 may include determining whether or not the authentication value 211a is valid, as depicted at block 211c. In an embodiment in which the authentication value is not valid, the application server 12 may refuse to grant the redirect request 208, as depicted at block 211d, and bypass the remainder of the steps of processing the redirect request 228 (e.g., proceed directly to the input of the connect request at block 206 of FIG. 4). For example, in an embodiment in which the subscriber is not authorized to submit a redirect request, and/or an embodiment in which the capacity of the network 10 is limited and the access privileges associated with the authentication value 211a do not exceed a minimum level, the redirect request may be refused and/or terminated. In an embodiment in which the authentication value 211a is valid, the application server 12 may continue to process redirect request 208 (e.g., continue to block 214 of FIG. 4). For example, in an embodiment in which the subscriber is authorized to submit a redirect request, and/or an embodiment in which the capacity of the network 10 is limited and the access privileges associated with the authentication value 211a exceed a minimum level, the application may not refuse the redirect request based on the authentication value 211a. In one embodiment, the application server 12 may implement application software configured to assess the authentication value 211a to determine whether or not the authentication value 211a is valid. In one embodiment, the application software may include an authentication assessment application configured to compare the authentication value 211a from the redirect request 208 to a predetermined list of valid values. As mentioned above, one embodiment of the method 200 may include authentication. One embodiment of the method 200 may not include authentication 211.

Returning now to FIG. 4, the illustrated embodiment of the method 200 includes determining a normal subscriber number 212, as depicted at block 214, and determining a modified subscriber number 216, as depicted at block 218. In one embodiment, determining the normal subscriber number 212 and/or the modified subscriber 216 number may include the application server 12 assessing the redirect request 208 to determine the normal subscriber number 212 and the modified subscriber number 216. In one embodiment, the application server 12 may implement application software configured to assess various portions of the redirect request. In one embodiment, the application software may include a redirect application configured to parse the normal subscriber number 212 and/or the modified subscriber number 216 from the from the redirect request 208.

The method 200 may include storing the redirect data (e.g., the normal subscriber number 212 and the modified subscriber number 216) in a database 220, as depicted at block 222. In one embodiment, the database 220 includes the storage medium 28 configured to store the normal subscriber number 212 and the modified subscriber number 216. For example, storing the numbers in a database 220 may include arranging the data in a format similar to that discussed previously with regard to FIG. 3. In other words, the normal subscriber number 212 may be stored in direct association with the modified subscriber number 216, such that the modified subscriber number 216 may be identified based on a search that is configured to locate the normal subscriber number 212.

In one embodiment, the application server 12 implements application software configured to store the normal subscriber number 212 and the modified subscriber number 216 in the database 220. The application software may include an add application that is configured to add user information to the number database 220.

It will be appreciated that where the modified subscriber number 216 matches a normal subscriber number already stored in the database 220, the subscriber may be attempting to return to a previous subscriber device and may no longer wish to have calls redirected. In such an embodiment, the application server 12 may completely remove the redirect data from the database 220. For example, in one embodiment, the application server 12 may implement application software configured to remove a row of redirect data from the table of FIG. 3. The application software may include a remove application that deletes the associated line of data from the table/database 220. In other embodiments, the remove application may be implemented by a separate request by the user. For example, in one embodiment, the service invocation may be indicative of a request to remove the redirect data associated with a normal subscriber number.

Following storing the numbers in the number database 220 as depicted at block 222, processing of the redirect request 208 may be complete and, the application server 12 may continue to process other network requests. As depicted, the method 200 may include checking for a connect request, as depicted at block 206. Thus, where a redirect request is not present on the network 10 at block 204, the method may forward directly to checking for a connect request. However, where a redirect request is present on the network 10 at block 204, the redirect request may be completed prior to checking for a connect request, as depicted at block 206.

Returning now to block 206, the method 200 may include checking for a connect request, as depicted at blocks 206. The request may be generated from a subscriber as discussed previously with regard to block 108 of FIG. 2. In one embodiment, the application server 12 is configured to poll communications/data/signals from devices on the network 10 to determine whether a connect request has been directed to the application server 12. In one embodiment, the application server 12 may employ application software configured to check incoming requests. In one embodiment, the application software includes the inspect application configured to inspect each request for service invocations, such as those indicative of a redirect request or a connect request.

In an embodiment in which a connect request has not been generated or transmitted to the application server 12, the method 200 may include forwarding to check if the routine should end, as depicted at blocks 224 and 226, and/or forwarding back to block 204 to check for a redirect request 208 and repeat the routine again. In an embodiment in which a connect request is directed to the application server 12, the method 200 may include receiving a connect request 228, as depicted at block 230. In one embodiment, receiving the connect request 228 may include receiving a signal/data indicative of the connect request and storing or queuing the connect request 228 for subsequent processing. In one embodiment, the application server 12 may implement application software configured to receive the request. For example, in one embodiment, the application software includes the receive application configured to receive, store and/or queue the request for processing. Some embodiments may include techniques similar to those discussed previously with regard to FIG. 2, block 110.

In the illustrated embodiment, the method 200 includes determining an authentication value 232, as depicted at block 234. The authentication value 232 may include data that is indicative of access privileges associated with the subscriber and/or the transmitter device that generates the connect request. In one embodiment, the authentication value 232 may be parsed from the connect request 228, or provided separately by the subscriber or transmitter device that generated the connect request. For example, in one embodiment, the application server 12 may implement application software configured to determine the authentication value 232 from the connect request 228. In one embodiment, the application software may include an authentication application configured to parse the authentication value 232 from the connect request 228.

The method 200 may include determining whether or not the authentication value 232 is valid, as depicted at block 236. In an embodiment in which the authentication value is not valid, the application server 12 may refuse to grant the connect request 228, as depicted at block 238, and bypass the remainder of the steps of processing the connect request 228. For example, in an embodiment in which the subscriber is not authorized to connect to the receiver device, and/or an embodiment in which the capacity of the network 10 is limited and the access privileges associated with the authentication do not exceed a minimum level, the connection may be refused and/or terminated. In an embodiment in which the authentication value 232 is valid, the application server 12 may continue to process connect request 228, as depicted at block 240. For example, in an embodiment in which the subscriber is authorized to connect to the receiver device, and/or an embodiment in which the capacity of the network 10 is limited and the access privileges associated with the authentication exceed a minimum level, the application may not refuse the connect request based on the authentication value 232. In one embodiment, the application server 12 may implement application software configured to assess the authentication value 232 to determine whether or not the authentication value 232 is valid. In one embodiment, the application software may include an authentication assessment application configured to compare the authentication value 232 from the connect request 228 to a predetermined list of valid values.

In an embodiment in which the authentication value 232 is validated, the method 200 may include determining a user status 240, as depicted at block 242. As discussed briefly above, the user status may include associating the request 228 with a grouping that can be used to assess the priority of the request 228 relative to other request. In one embodiment, the application server 12 may determine which status group the user belongs to based on the user status 240. In one embodiment, the application server may implement application software configured to determine the user status 240 based on the connect request 228, the authentication 232, the device used to place the request, and the like. In one embodiment, the application software may include a status application configured to parse the user status 240 from the connect request 228.

The method 200 may include determining whether or not a higher priority request exists, as depicted at block 244. In an embodiment in which one or more request exists that have a higher priority than the connect request 228, or the user status 240 is not above a priority threshold, the application server 12 may refuse to grant the connect request 228, as depicted at block 238. For example, in an embodiment in which in which the capacity of the network 10 is limited and the subscriber has a user status 240 of tribal government status and another subscriber attempting to make a call has a federal government status, the connection may be refused and/or queued to be connected when there is sufficient capacity on the network 10 to handle the calls of lower priority as well as the calls of a higher priority.

In an embodiment in which it is determined that the user status 240 is of sufficiently high priority, the application server 12 may continue to process connect request 228. For example, in an embodiment in which the user status is sufficient to complete the request, the method 200 may include determining a requested number 246, as depicted at block 248. The requested number 246 may include a number associated with a receiver device the subscriber generating the connect request desires to connect to. In one embodiment, determining the requested number 246 may include the application server 12 determining the requested number based on the connect request. In one embodiment, the application server 12 may implement application software configured to determine the requested number 246 based on the connect request 228. In one embodiment, the application software may include a request number application configured to parse the requested number 246 from the connect request 228.

The method 200 may include determining whether or not a redirect request exists that is associated with the requested number, as depicted at block 248. In one embodiment, determining whether or not a redirect request exists that is associated with the normal subscriber number includes scanning the database 220 for a normal subscriber number 212 that matches the requested number 246. In one application, the application server 12 may implement application software configured to determine whether or not there is redirect data associated with the requested number 246. In one embodiment, the application software includes a scan application configured to scan the number database to determine if the number database 220 includes a normal subscriber number 212 that matches the requested number 246. In an embodiment in which the database 220 includes an arrangement of data similar to the table of FIG. 3, the scan application may search only the normal subscriber number column.

If a match is located, a prior redirect request 208 exists that is associated with the requested number 246. In such an embodiment, the application server 12 may configure the network 10 to connect the receiver device to the modified subscriber device associated with the modified subscriber number 216. In one embodiment, the application server 12 may generate a connect command 252, as depicted at block 250. The connect command 252 may be configured to connect the call from the transmitter device to the modified subscriber device associated with the modified subscriber number 216. In an embodiment in which a match is not located, this is indicative that a redirect request associated with the normal subscriber number does not exist. In such an embodiment, the application server 12 may generate the connect command 250 that is configured to connect the call from the transmitter device to a receiver device associated with the requested number 246, as depicted at block 254. In one embodiment, the application server 12 may implement application software that employs a connect application configured to generate the appropriate connect command 250.

Following generating the connect command 250, the application server 12 may issue the connect command 250, as depicted at block 256. Issuing the connect command configures a plurality of switches within the network 10 to provide contiguous connection from the transmitter device to a receiver device associated with the requested number 246 or the modified subscriber number 216.

The method 200 may be performed in a continuous loop to enable the application server 12 to continuously handle requests from subscribers. For example, in the illustrated embodiment, the method 200 includes assessing whether execution of the routine should end, as depicted at block 224. If the routine determines that execution should end (e.g., if a shutdown of the application server 12 has been requested), the method proceeds to block 226 and the routine ends. If the routine determines that execution should not end, the routine may return to block 204.

The method 200 may include numerous variations to those discussed above. For instance, in some embodiments the steps related to authentication (e.g., blocks 234, 232 and 236) and the steps related to user status (e.g., blocks 242, 244 and 244) may be rearranged relative to one another or not performed at all. For example, authentication and/or prioritization may not be considered in some embodiments and/or may be implemented in processing of the redirect request in some embodiments.

Further, although each of the steps has been described as being performed by the application server 12, other embodiments may include delegation of each of the steps to other devices within the network 10. For example, one or more of the switches may be configured to exchange request with a subscriber device and forward the information to the application server 12. For example, in one embodiment, the receiving of the redirect and/or connect request may be completed at one of the switches (14A-14I), and a portion or all of the processing completed at the switch before being directed to the application server 12 for further processing.

The techniques discussed above may be of particular use for telecommunication networks that are configured to provide critical communications in a time of crisis. For example, the previously discussed embodiments may be employed as part of the government emergency telecommunications service (GETS). GETS is a White House-directed emergency phone service provided by the National Communications System (NCS) in the Cyber Security & Communications Division, National Protection and Programs Directorate of the Department of Homeland Security. GETS supports Federal, State, local, and tribal government, industry, and non-governmental organization (NGO) personnel in performing their National Security and Emergency Preparedness (NS/EP) missions. GETS provides emergency access and priority processing in the local and long distance segments of the Public Switched Telephone Network (PSTN). It is intended to be used in an emergency or crisis situation when the PSTN is congested and the probability of completing a call over normal or other alternate telecommunication means has significantly decreased. GETS is necessary because of the increasing reliance on telecommunications. The economic viability and technical feasibility of such advances as nationwide fiber optic networks, high-speed digital switching, and intelligent features have revolutionized the way we communicate. This growth has been accompanied by an increased vulnerability to network congestion and system failures. Although backup systems are in place, disruptions in service can still occur. Recent events have shown that natural disasters, power outages, fiber cable cuts, and software problems can cripple the telephone services of entire regions. Additionally, congestion in the PSTN, such as the well-documented "Mother's Day phenomenon," can prevent access to circuits. However, during times of emergency, crisis, or war, personnel with NS/EP missions need to know that their calls will go through. GETS addresses this need. Using enhancements based on existing commercial technology, GETS allows the NS/EP community to communicate over existing PSTN paths with a high likelihood of call completion during the most severe conditions of high-traffic congestion and disruption. The result is a cost-effective, easy-to-use emergency telephone service that is accessed through a simple dialing plan and Personal Identification Number (PIN) card verification methodology. It is maintained in a constant state of readiness as a means to overcome network outages through such methods as enhanced routing and priority treatment.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. The words "include", "including", and "includes" mean including, but not limited to.

What is claimed is:

1. A method, comprising:
   setting a connect threshold;
   receiving a redirect request from one or more switches of a telecommunications network, wherein the redirect request comprises a normal subscriber number and a modified subscriber number;
   receiving, from one or more switches of the telecommunications network, a connect request that requests connection of a transmitter device to a receiver device associated with the normal subscriber number;

receiving an authentication of a user making a connect request, wherein receiving the authentication of the user making the connect request comprises receiving a status of the user making the connect request;

granting the connect request when the user status satisfies the connect threshold and refusing or delaying the connect request when the user status does not satisfy the connect threshold; and configuring the telecommunication network to connect the transmitter device to a receiver device associated with the modified subscriber number.

2. The method of claim 1, wherein receiving a redirect request comprises receiving at an application server a redirect request.

3. The method of claim 1, wherein receiving comprises receiving by at least one of a plurality of distributed application servers of the telecommunication network.

4. The method of claim 1, wherein the redirect request comprises a request generated by a subscriber at a subscriber device associated with one or more switches of the telecommunication network.

5. The method of claim 4, wherein receiving the redirect request comprises receiving from the subscriber device a single redirect request comprising the normal subscriber number and the modified subscriber number.

6. The method of claim 1, wherein the redirect request is generated from a subscriber device located on a different exchange than the receiver device associated with the normal subscriber number.

7. The method of claim 1, wherein the authentication comprises a personal identification number (PIN).

8. The method of claim 1, further comprising receiving the authentication comprises receiving an authentication of the subscriber making the redirect request.

9. The method of claim 8, comprising determining whether or not to grant the redirect request based on the authentication of the subscriber.

10. The method of claim 1, comprising determining whether or not to grant the connect request based on the authentication of the user.

11. The method of claim 1, comprising prioritizing the connect request based on the authentication.

12. The method of claim 1, wherein the status comprises one of federal government status, state government status, local government status, tribal government status, critical industry status, national security status, emergency preparedness status, or a combination thereof.

13. The method of claim 1, further comprising ranking the status among other available user statuses, wherein granting the connect request comprises granting the connect request when the user status is ranked equal to or above the connect threshold and wherein refusing the connect request comprises refusing or delaying the connect request when the user status is ranked below the connect threshold.

14. The method of claim 1, comprising storing the modified subscriber number.

15. The method of claim 14, wherein storing the modified subscriber number comprises storing in a database the modified subscriber number and the normal subscriber number in association with one another.

16. The method of claim 14, wherein storing the modified subscriber number comprises storing the modified subscriber number on a database that is separate from the application server.

17. The method of claim 14, wherein storing the modified subscriber number comprises storing the modified subscriber number on at least one database of a plurality of distributed databases.

18. The method of claim 1, wherein the telecommunication network comprises a circuit-switched telephone network.

19. The method of claim 1, wherein the telecommunication network comprises a packet-switched telephone network.

20. The method of claim 1, wherein the switch from which the redirect request is received is the switch serving the receiver device associated with the normal subscriber number.

21. The method of claim 1, wherein the switch from which the redirect request is received is not the switch serving the receiver device associated with the normal subscriber number.

22. A non-transitory, computer-readable medium comprising program instructions stored thereon, wherein the program instructions are computer-executable to implement method comprising:

set a connect threshold;

receiving a redirect request from one or more switches of a telecommunications network, wherein the redirect request comprises a normal subscriber number and a modified subscriber number;

receiving, from one or more switches of the telecommunications network, a connect request that requests connection of a transmitter device to a receiver device associated with the normal subscriber number;

receiving an authentication of a user making a connect request, wherein receiving the authentication of the user making the connect request comprises receiving a status of the user making the connect request;

granting the connect request when the user status satisfies the connect threshold and refusing or delaying the connect request when the user status does not satisfy the connect threshold; and configuring the telecommunication network to connect the transmitter device to a receiver device associated with the modified subscriber number.

23. A telecommunication system, comprising:

a plurality of switches interconnected to one another;

a plurality of subscriber devices comprising at least one transmitter device and at least one receiver device;

one or more databases; and one or more application servers, wherein one or more of the plurality of the switches is disposed between the application server and each of the subscriber devices, and wherein at least one of the one or more application servers is configured to:

set a connect threshold;

receive a redirect request from one or more switches of a telecommunications network, wherein the redirect request comprises a normal subscriber number and a modified subscriber number;

receive, from one or more switches of the telecommunications network, a connect request that requests connection of a transmitter device to a receiver device associated with the normal subscriber number;

receive an authentication of a user making a connect request, wherein receiving the authentication of the user making the connect request comprises receiving a status of the user making the connect request;

grant the connect request when the user status satisfies the connect threshold and refuse or delay the connect request when the user status does not satisfy the connect threshold; and configure the telecommunication network to connect the transmitter device to a receiver device associated with the modified subscriber number.

24. The telecommunication system of claim 23, wherein at least one of the switches serves an exchange of one or more subscriber devices.

25. The telecommunication system of claim 24, wherein the application server is configured to redirect, to a subscriber device on a second exchange served by a second switch, a call associated with a connect request that requests a connection to a subscriber device on the exchange when at least one switch that serves the exchange is inoperable.

* * * * *